(12) United States Patent
Huang

(10) Patent No.: US 10,382,228 B2
(45) Date of Patent: Aug. 13, 2019

(54) PROTECTING CUSTOMER VIRTUAL LOCAL AREA NETWORK (VLAN) TAG IN CARRIER ETHERNET SERVICES

(71) Applicant: BROADCOM CORPORATION, Irvine, CA (US)

(72) Inventor: Ching-Liang Huang, Irvine, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 439 days.

(21) Appl. No.: 14/728,331

(22) Filed: Jun. 2, 2015

(65) Prior Publication Data
US 2015/0381531 A1  Dec. 31, 2015

Related U.S. Application Data

(60) Provisional application No. 62/017,797, filed on Jun. 26, 2014.

(51) Int. Cl.
*H04L 12/46* (2006.01)
*H04L 29/06* (2006.01)

(52) U.S. Cl.
CPC ...... *H04L 12/4645* (2013.01); *H04L 63/0272* (2013.01); *H04L 63/12* (2013.01)

(58) Field of Classification Search
None
See application file for complete search history.

(56) References Cited

U.S. PATENT DOCUMENTS

| | | | | |
|---|---|---|---|---|
| 6,862,280 B1* | 3/2005 | Bertagna | ............ | H04L 12/4641 370/392 |
| 7,720,031 B1* | 5/2010 | Cheng | ............... | H04L 12/4641 370/331 |
| 9,479,522 B1* | 10/2016 | Cirkovic | ............ | H04L 63/1416 |
| 2002/0021701 A1* | 2/2002 | Lavian | ............... | H04L 12/5693 370/401 |
| 2003/0145118 A1* | 7/2003 | Volpano | ............... | H04L 9/3242 709/249 |
| 2004/0233878 A1* | 11/2004 | Liu | ....................... | H04L 1/0045 370/338 |
| 2006/0227773 A1* | 10/2006 | Grewal | ................ | H04L 63/123 370/389 |

(Continued)

*Primary Examiner* — Jeffrey M Rutkowski
*Assistant Examiner* — Andre Tacdiran
(74) *Attorney, Agent, or Firm* — Morgan, Lewis & Bockius LLP

(57) ABSTRACT

In the subject system, a customer virtual local network (VLAN) tag is protected using, for example, media access control security (MACSec). MACSec authentication is performed on a packet by including the VLAN tag in an integrity check value (ICV) computation. When a packet is received from an Ethernet Virtual Connection (EVC) at an ingress port of the subject system, a remote site is identified and an associated VLAN tag is determined based on the identified remote site and a VLAN tag associated with the packet. The subject system may perform VLAN tag mapping to account for changes in a VLAN tag across EVCs. An ICV is computed based on the determined VLAN tag and compared with an ICV stored in the received packet. The integrity check passes when the computed ICV matches the stored ICV and fails when the computed ICV does not match the stored ICV.

22 Claims, 8 Drawing Sheets

(56) References Cited

U.S. PATENT DOCUMENTS

| | | | |
|---|---|---|---|
| 2006/0245436 A1* | 11/2006 | Sajassi | H04L 12/2898 370/395.53 |
| 2007/0266122 A1* | 11/2007 | Einarsson | H04N 21/4383 709/220 |
| 2008/0013547 A1* | 1/2008 | Klessig | H04L 12/66 370/395.53 |
| 2008/0075073 A1* | 3/2008 | Swartz | H04L 63/162 370/389 |
| 2008/0279181 A1* | 11/2008 | Shake | H04L 1/08 370/389 |
| 2009/0307751 A1* | 12/2009 | Lin | H04L 63/101 726/3 |
| 2010/0046443 A1* | 2/2010 | Jia | H04W 76/11 370/329 |
| 2010/0054251 A1* | 3/2010 | Lee | H04L 12/4641 370/392 |
| 2012/0054358 A1* | 3/2012 | Yamada | H04L 12/4625 709/229 |
| 2012/0201247 A1* | 8/2012 | Sajassi | H04L 12/18 370/392 |
| 2013/0091349 A1* | 4/2013 | Chopra | H04L 45/50 713/150 |
| 2013/0176898 A1* | 7/2013 | Klessig | H04L 41/0803 370/254 |
| 2014/0215047 A1* | 7/2014 | Li | H04L 47/2441 709/223 |

\* cited by examiner

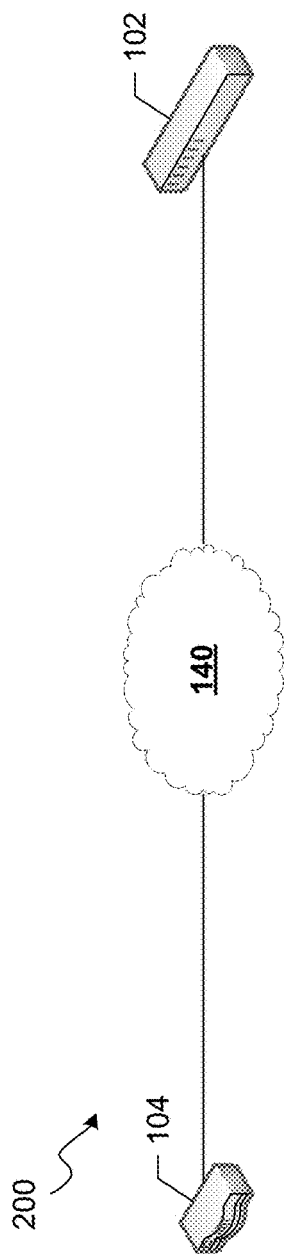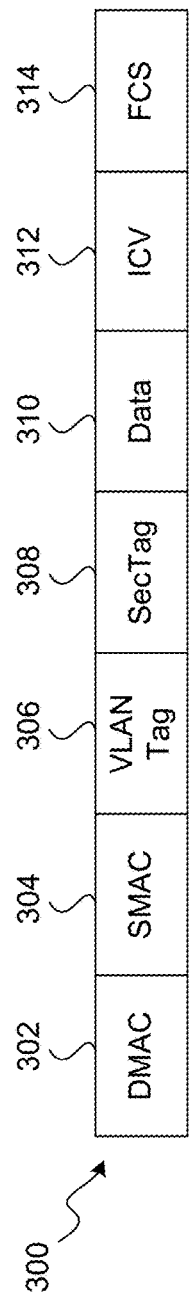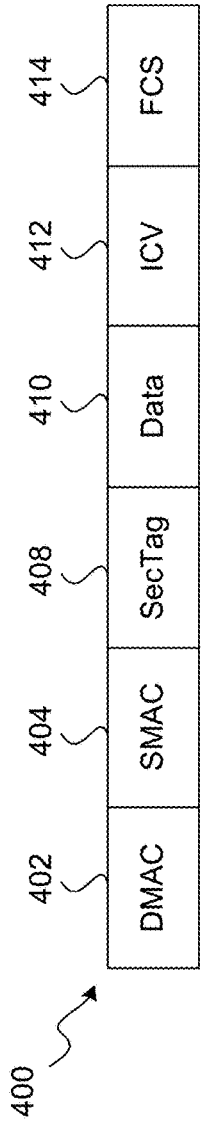

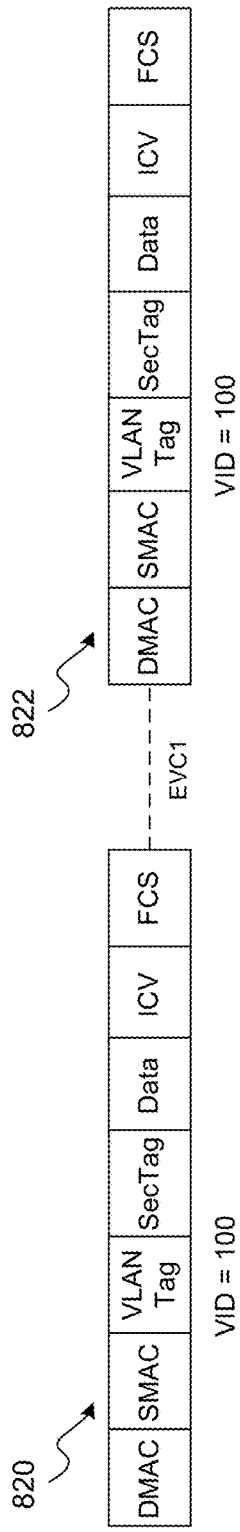
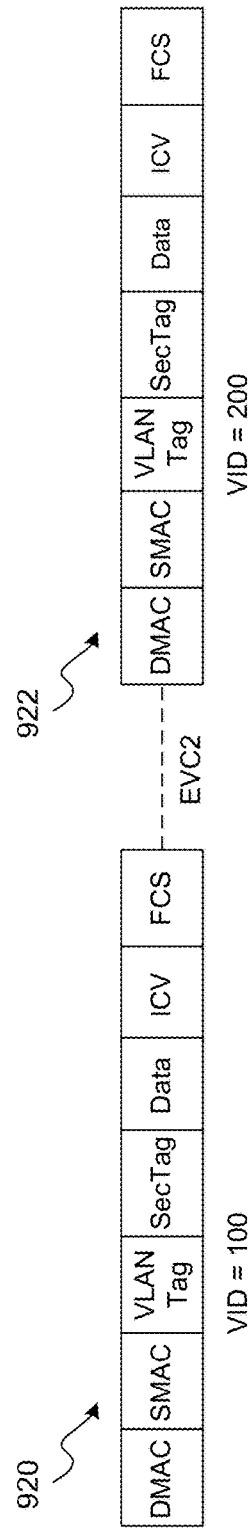
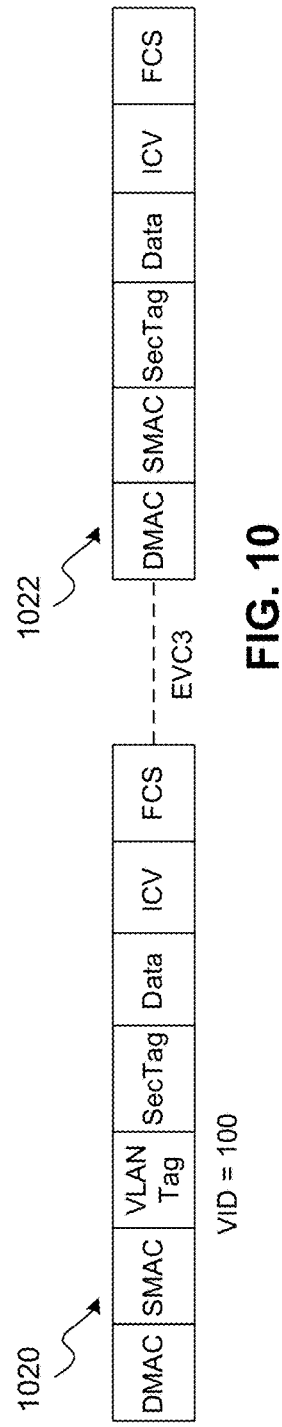
FIG. 8
FIG. 9
FIG. 10

PROTECTING CUSTOMER VIRTUAL LOCAL AREA NETWORK (VLAN) TAG IN CARRIER ETHERNET SERVICES

CROSS-REFERENCE TO RELATED APPLICATIONS

The present application claims the benefit of U.S. Provisional Patent Application No. 62/017,797, entitled "Secure Virtual Local Area Network (VLAN) Tag," filed on Jun. 26, 2014, which is hereby incorporated by reference in its entirety for all purposes.

TECHNICAL FIELD

The present description relates generally to network communications, including secure virtual local area network (VLAN) tags.

BACKGROUND

Network services provided by Carrier Ethernet service providers, such as Ethernet virtual private line services and Ethernet virtual private LAN services, facilitates network connections between multiple geographically remote customer locations via Ethernet Virtual Connections (EVCs). When the customers utilize VLAN tags, the tags may be included in the data traffic that is transmitted across the EVCs. If the VLAN tags are accessible to a third party, the third party may be able to adjust the VLAN tag. However, inappropriate adjustment of VLAN tags may leak information from one VLAN to another VLAN. Such adjustment may also result in incorrect computations for certain Layer 2 control protocols, such as Generic Attribute Registration Protocol Multicast Registration Protocol (GMRP).

BRIEF DESCRIPTION OF THE DRAWINGS

Certain features of the subject technology are set forth in the appended claims. However, for purpose of explanation, several embodiments of the subject technology are set forth in the following figures.

FIGS. 1 and 2 illustrate example network environments in which secure VLAN tags may be implemented in accordance with one or more implementations.

FIGS. 3 and 4 illustrate example Ethernet frame formats that utilize media access control security in accordance with one or more implementations.

FIGS. 8 through 12 illustrate examples of frames that may be transmitted by an edge network device and received by another edge network device in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more instances, structures and components are shown in block diagram form in order to avoid obscuring the concepts of the subject technology.

Figure 1:
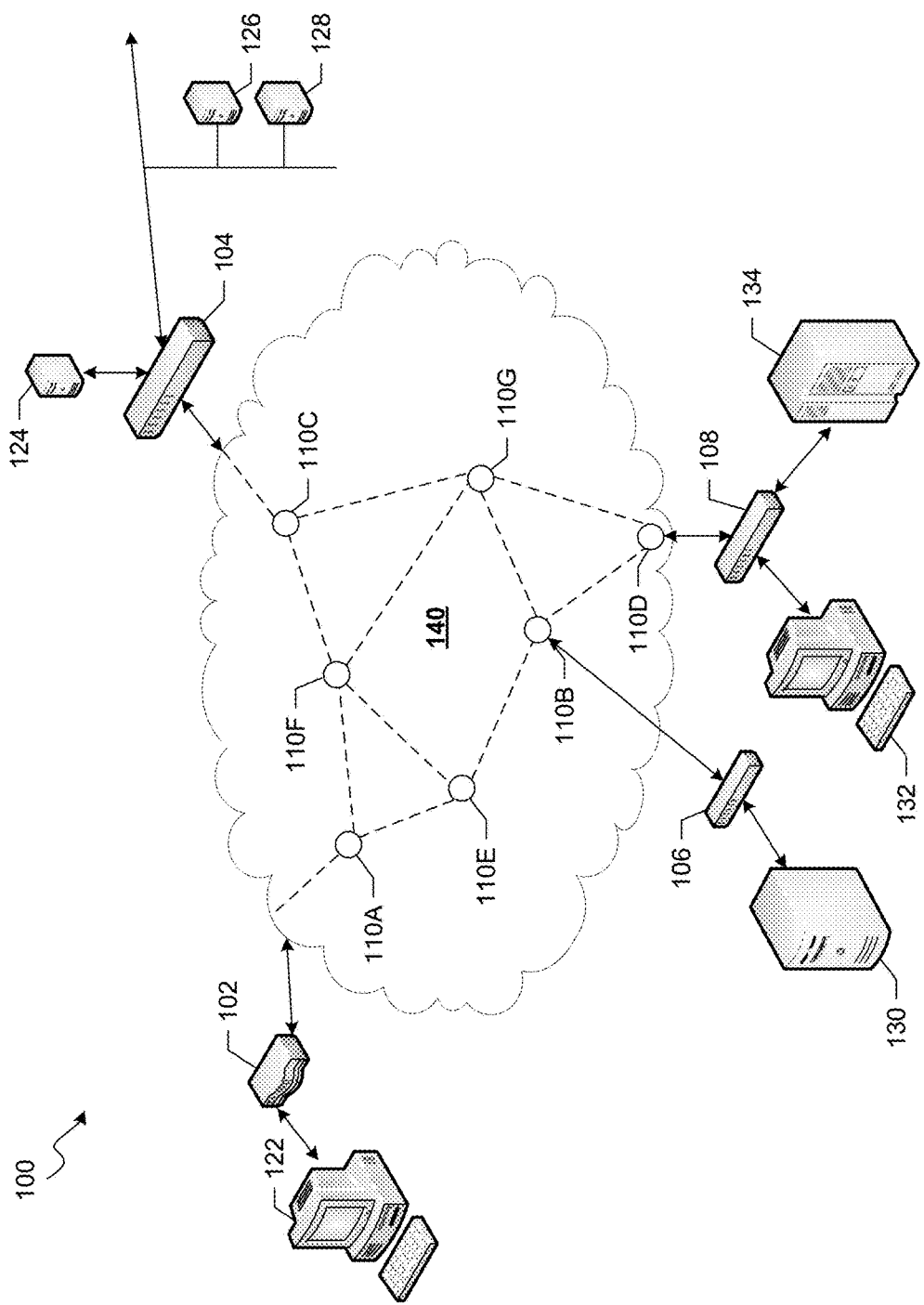

FIG. 1 illustrates an example network environment 100 in which secure VLAN tags may be implemented in accordance with one or more implementations. Not all of the depicted components may be required, however, and one or more implementations may include additional components not shown in FIG. 1. Variations in the arrangement and type of the components may be made without departing from the spirit or scope of the claims as set forth herein. Additional components, different components, or fewer components may be provided.

The example network environment 100 includes a network 140, network devices 102, 104, 106, 108, and 110A-G, and computing devices 122, 124, 126, 128, 130, 132, and 134. The network 140 is a part of a network of a Carrier Ethernet service provider. The network 140 may provide one or more services, such as an Ethernet-line (E-Line) service that connects two or more of the network devices 102, 104, 106, and 108 via point-to-point connections, an Ethernet-local area network (E-LAN) multipoint service that connects the network devices 102, 104, 106, and 108 and gives the appearance of a bridged Ethernet network, an Ethernet-Tree (E-Tree) multipoint service that connects one or more roots and a set of leaves but prevents inter-leaf communication, or generally any other Ethernet service. In one or more implementations, one or more of the network devices 102, 104, 106, and 108 subscribe to one or more services.

In one or more implementations, the network devices 102, 104, 106, and 108 may be referred to as customer edge devices and the network devices 110A-D may be referred to as provider edge devices. In these implementations, the various computing devices 122, 124, 126, 128, 130, 132, and 134 may be referred to as customer devices or systems, and the network devices 110E-G may be referred to as provider devices. A connection between a customer edge device (e.g., network device 102) and a provider edge device (e.g., network device 110A) may be referred to as a user network interface (UNI), which is an interface that forms the demarcation between a customer/subscriber and a service provider.

The network environment 100 may include, or may be part of, a private network including a VLAN such as a data-center network, an enterprise network, or other private networks. A VLAN may include, and/or may be, a group of hosts or network devices that can communicate with each other, such as across one or more geographically remote and/or proximal locations. VLANs are supported on an Ethernet network, for example, by the Institute of Electrical and Electronics Engineers (IEEE) 802.1Q standard that contains provisions for a quality of service (QoS) prioritization scheme, IEEE P802.1p, which may be referred to as.1p priority. In the IEEE 802.1Q standard, an 802.1Q tag, which may be referred to as a VLAN tag or a .1Q tag, is added to an Ethernet frame. The VLAN tag contains, among other fields, a VLAN identifier (ID) field that contains the VLAN ID for the frame and a priority code point (PCP) field that contains a priority value (e.g., .1p priority value) for the frame.

In one or more implementations, the network devices 102, 104, 106, and 108 communicate with one another using VLAN tags, such as over the network 140. For example, the network device 102 may transmit a frame, such as an Ethernet frame, containing a VLAN tag and an encapsulated packet that is intended to be received by the network device 104. Frames transmitted by the network devices 102, 104, 106, and 108 over the network 140 may include VLAN tags. In one or more implementations, the VLAN tags are appended to the frames in clear text (e.g., not encrypted) by the network devices 102, 104, 106, and 108. Thus, in these implementations the VLAN tags are accessible, e.g. to a third party, as the frames pass through the network 140.

In one or more implementations, one or more security protocols, such as the IEEE 802.1yE standard that allows for authentication and encryption of packets, and that may be referred to as media access control security (MACSec), are deployed at network devices to protect customer traffic. For example, MACSec may be employed at customer edge devices located at UNIs to protect customer traffic across EVCs. In one or more implementations, the network devices 102, 104, 106, and 108 initialize MACSec secured communications by performing a MACSec key agreement (MKA) negotiation with each other to establish a set of agreed upon keys for use in encryption and decryption of packet data. A packet in a frame sent between any two or more of the network devices 102, 104, 106, and 108 may be encrypted and decrypted using Advanced Encryption Standard Galois/Counter Mode (AES-GCM) (e.g., 128-bit AES-GCM, 256-bit AES-GCM) with agreed upon keys. In one or more implementations, one or more of the network devices 102, 104, 106, and 108 are associated with one or more connectivity associations that are associated with a respective set of key(s) by which to encrypt or decrypt data.

The network devices 102, 104, 106, and/or 108 secure packets through the use of MACSec by placing a security tag (SecTag) in the frame that encapsulates the packet. The SecTag may be inserted into the frame by a customer edge device (e.g., network device 102), when the encapsulated packet is provided to the customer edge device by a customer device (e.g., computing device 122). The SecTag includes information pertaining to securing the packet, such as information pertaining to the encryption of the packet. In one or more implementations, the SecTag is inserted after a VLAN tag in a frame, and therefore the VLAN tag is not encrypted. However, in addition to encryption, MACSec also includes authentication (e.g., an integrity check) of received frames.

MACSec authentication is performed on a received frame by computing an integrity check value (ICV) based on content of the received frame. The computed ICV may be compared to an ICV contained in the received frame, e.g. an ICV that was computed by the transmitting device based on the content prior to transmitting the frame. Thus, the content of the frame that is used in the ICV computation can be authenticated by the receiving device by comparing the computed ICV to the ICV contained in the received frame. Accordingly, a VLAN tag of a frame may be authenticated by including the VLAN tag in the ICV computation.

However, in one or more implementations, the network devices 102, 104, 106, and/or 108 use different VLAN identifiers and/or priority values for the same networks and/or services. For example, the network device 102 may use a VLAN identifier of "101" for a virtual LAN, while the network device 104 may use a VLAN identifier of "102" for the same virtual LAN. Thus, one or more of the network edge devices 110A-D of the network 140, such as a provider edge device (e.g., network device 110A), translates the VLAN identifiers and/or priority values of frames transmitted between the network devices 102 and 104 such that the received frames include the appropriate VLAN identifier and/or priority value used by the respective receiving network devices 102 and 104. In one or more implementations, the translation of the VLAN ID and/or priority value facilitates transmission of a packet encapsulated in the frame to an intended endpoint device. However, if the receiving network device 102 or 104 computes the ICV of a received frame using the translated VLAN tag, the computed ICV will not match the ICV contained in the received frame, since the ICV contained in the received frame was computed using the original VLAN tag.

In the subject system, the network devices 102, 104, 106, and/or 108 utilize a data structure, such as a mapping table, to map between the received (and translated) VLAN tag and/or priority value, and the original VLAN tag and/or priority value, when the tags and/or priority values differ. In this manner, the network devices 102, 104, 106, and/or 108 can compute the ICV of a received frame using the original VLAN tag and the original priority value, and can then properly compare the computed ICV to the ICV contained in the received frame. Thus, the subject system provides for the transmission of secure, e.g. authenticated, VLAN tags across networks even when the VLAN tags are translated by network devices of the network.

The mapping tables utilized by the network devices 102, 104, 106, and/or 108 are constructed and maintained to provide mappings for a service (e.g., Carrier Ethernet service). For example, with reference to FIG. 1, the four customer sites (e.g., four network devices 102, 104, 106, 108) may be connected by an all-to-one bundling E-LAN service. Table 1 provides an example VLAN ID mapping table for the network device 102. The network device 102 can communicate with the network device 104, the network device 106, and the network device 108, identified as remote site 2, remote site 3, and remote site 4, respectively. The index/identifier attached to each remote site (e.g., 2, 3, 4) may be arbitrary and utilized for convenience in creating and maintaining the VLAN mapping table for the network device 102.

TABLE 1

VLAN mapping table for the network device 102

| Remote site ID | Ingress VLAN ID | Remote VLAN ID |
| --- | --- | --- |
| 2 | 101 | 102 |
| 2 | 201 | 202 |
| 2 | 301 | 302 |
| 3 | 101 | 103 |
| 3 | 201 | 203 |
| 3 | 301 | 303 |
| 4 | 101 | 104 |
| 4 | 201 | 204 |
| 4 | 301 | 304 |
| 4 | 401 | 404 |

In one or more implementations, the remote site is determined from the SecTag contained in a received frame, such as the secure channel identifier (SCI) field of the SecTag. The SCI field includes information that can be utilized to identify the source network device that applied MACSec to the packet that is encapsulated in the frame. In one or more implementations, to protect traffic between the customer edge devices, one or multiple group connectivity associations are used for each E-LAN service, and one or multiple pairwise connectivity associations are used for each E-Line service. In either case, a customer edge device can use the SCI field contained in the received packet to identify the remote site. Using the remote site ID and the ingress VLAN ID of the received frame as the key, the network device 102 can determine the VLAN ID used by the remote site. The determined VLAN ID will be included as part of the ICV computation on the received frame, rather than using the VLAN ID of the received frame. However, the VLAN ID of the received frame may still be utilized for all other purposes, such as routing, frame processing, etc.

In one or more implementations, a frame with a VLAN ID of "101" is received at an ingress port of the network device 102, and the remote site can be determined to be remote site 2, such as via the SCI field. The network device 102 may use Table 1 to determine that the remote VLAN ID is "102". Accordingly, Table 1 indicates that traffic received by the network device 102 with a VLAN ID of "101" from remote site 2 can be mapped to a remote VLAN ID of "102". As another example, if a frame is received from remote site 2 with a VLAN ID of "201", the network device 102 may determine, via Table 1, that the remote VLAN ID is "202". In one or more implementations, the mapping tables for VLAN ID and/or priority values are provided by the provider edge devices to the customer edge devices and/or are created and maintained by each of the customer edge devices. In one or more implementations, if the remote VLAN ID is the same as the ingress VLAN ID, a mapping between the VLAN IDs is omitted from the mapping table, e.g. to conserve memory.

FIG. 2 illustrates an example network environment 200 in which secure VLAN tags may be implemented in accordance with one or more implementations. The network environment 200 includes the network device 102 in communication with the network device 104 via the network 140. Frames that are transmitted between the network device 102 and the network device 104 of FIGS. 1 and 2, among other devices shown in FIG. 1, may utilize the Ethernet frame format 300 of FIG. 3. Alternatively or in conjunction, other Ethernet frame formats, such as those shown in FIGS. 4, 14, 15, and 16, among others, may be utilized. FIG. 2 illustrates an example of a simple Layer 2 (L2) network, e.g. an L2 network without going through a service provider. The same details as described above in relation to FIG. 1 also apply to FIG. 2. However, the default VLAN ID and default priority are associated with the ingress/egress port, and there is no VLAN ID and priority translation.

FIG. 3 illustrates an example Ethernet frame format 300 at a UNI that utilizes MACSec in accordance with one or more implementations. The Ethernet frame format 300 includes a destination MAC address (DMAC) field 302, a source MAC address (SMAC) field 304, a VLAN tag field 306, a SecTag field 308, a data field 310, an ICV field 312, and a frame check sequence (FCS) field 314.

The VLAN tag field 306, which may be referred to as the 802.1Q tag or the .1Q tag, is described in more detail with reference to FIG. 13. The VLAN tag field 306 contains, among other fields, a PCP field and a VLAN ID field. The PCP field may include a value (e.g., numerical value) for a QoS priority. In one or more implementations, the PCP field contains a .1p priority value for the frame. The VLAN ID field may include information for specifying the VLAN ID to which a given frame belongs. The ICV field 312 includes information that can be utilized to authenticate the content of the frame, where the content includes the VLAN tag field 306.

The SecTag field 308 is identified by a MACSec Ethertype (0x88E5), and conveys tag control information (TCI), an association number (AN), and an SCI, among other information. The TCI field facilitates, for example, version numbering of the MACSec protocol without changing the MACSec Ethertype and optional use of the SMAC to convey the SCI. The AN field identifies up to a number (e.g., four) of different secure associations (SA) within the context of a secure channel (SC). The SCI field facilitates, for example, identification of the SA and network management identification of the security entity (SecY) that transmitted the frame.

The DMAC field 302 includes information that can be utilized to identify a destination endpoint node (e.g., computing device 130 in FIG. 1) that a given packet is to be sent to. The destination endpoint node is generally the device that will consume information in the packet. The SMAC field 304 includes information that can be utilized to identify a source endpoint node (e.g., computing device 122 in FIG. 1) that originated the packet. In one or more implementations, the destination and source endpoint nodes are one or multiple customer devices (e.g., computing devices 122, 124, 126, 128, 130, 132, 134 in FIG. 1) if the packet is switched by a customer premises equipment (CPE) device or the destination and source endpoint nodes are one or multiple CPE devices if the packet is routed.

The data field 310, which may also be referred to as the payload field, includes the data being transmitted. The data being transmitted includes a packet, such as, by way of non-limiting example, an Internet Protocol (IP) packet or a Transmission Control Protocol (TCP) IP (TCP/IP) packet. The data field 310 may be encrypted with a key through the use of MACSec. The FCS field 314 includes information that can be utilized to provide error detection for the frame. The FCS field 314 contains a cyclic redundancy code.

FIG. 4 illustrates another example Ethernet frame format 400 at an UNI that utilizes MACSec in accordance with one or more implementations. The Ethernet frame format 400 includes the DMAC field 402, SMAC field 404, SecTag field 408, data field 410, ICV field 412, and FCS field 414. In one or more implementations, the fields 402, 404, 408, 410, 412, and 414 include the same or similar information as information included in the fields 302, 304, 308, 310, 312, and 314 of FIG. 3. The Ethernet frame format 400 can be referred to as a VLAN untagged frame, since the Ethernet frame format 400 does not include an 802.1Q tag field.

Figure 5:
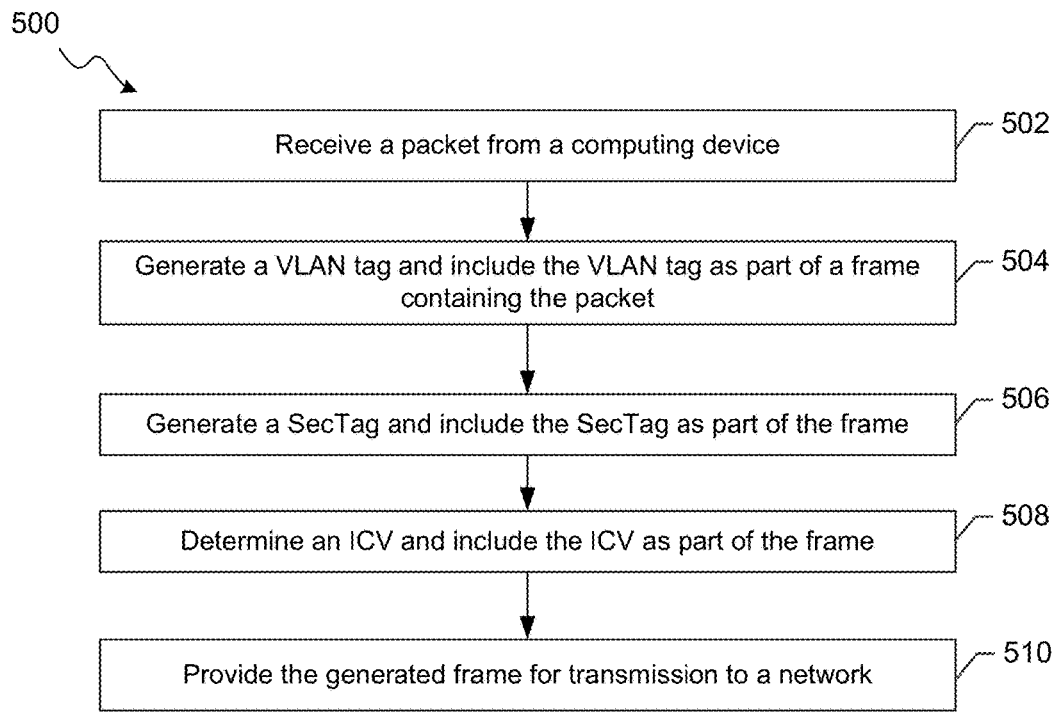
FIGS. 5 and 6 illustrate flow diagrams of example processes for generating a frame and providing the generated frame for transmission in accordance with one or more implementations.

FIG. 5 illustrates a flow diagram of an example process 500 for generating a frame and providing the generated frame for transmission in accordance with one or more implementations. For explanatory purposes, the example process 500 is primarily described herein with reference to the network device 104 of the network environments 100 and 200 of FIGS. 1 and 2, and the Ethernet frame format 300 of FIG. 3. For example, the network device 104 may generate a frame and provide the generated frame for transmission to the network 140. However, the example process 500 is not limited to the network device 104, and one or more blocks of the example process 500 may be performed by one or more components of the network device 104.

The blocks of the process 500 do not need to be performed in the order shown. It is understood that the depicted order is an illustration of one or more example approaches, and are not meant to be limited to the specific order or hierarchy presented. The blocks can be rearranged, and/or two or more of the blocks can be performed simultaneously. Additional blocks, fewer blocks, and/or different blocks may be provided.

The network device 104 receives a packet from the computing device 124 (502). The network device 104 generates a frame based on the packet received from the computing device 124. The generated frame includes as payload the received packet. The generation of the frame includes blocks 504, 506, and 508.

In this example, the network device 104 generates a VLAN tag and includes the VLAN tag as part of the frame (504). The VLAN tag contains the VLAN ID and the priority value for the frame. The network device 104 generates a SecTag and includes the SecTag as part of the frame (506). The SecTag includes information pertaining to securing the packet that is encapsulated in the payload of the frame, such as information pertaining to the encryption of the packet. In one or more implementations, the SecTag is inserted after the VLAN tag in the frame, and therefore the VLAN tag is not encrypted. The network device 104 determines an ICV and includes the ICV as part of the frame (508). The ICV is determined based on the content of the frame, including the VLAN tag and SecTag that have been included in the frame. Inclusion of the VLAN tag in the ICV computation allows authentication of the VLAN tag of the frame.

Figure 6:
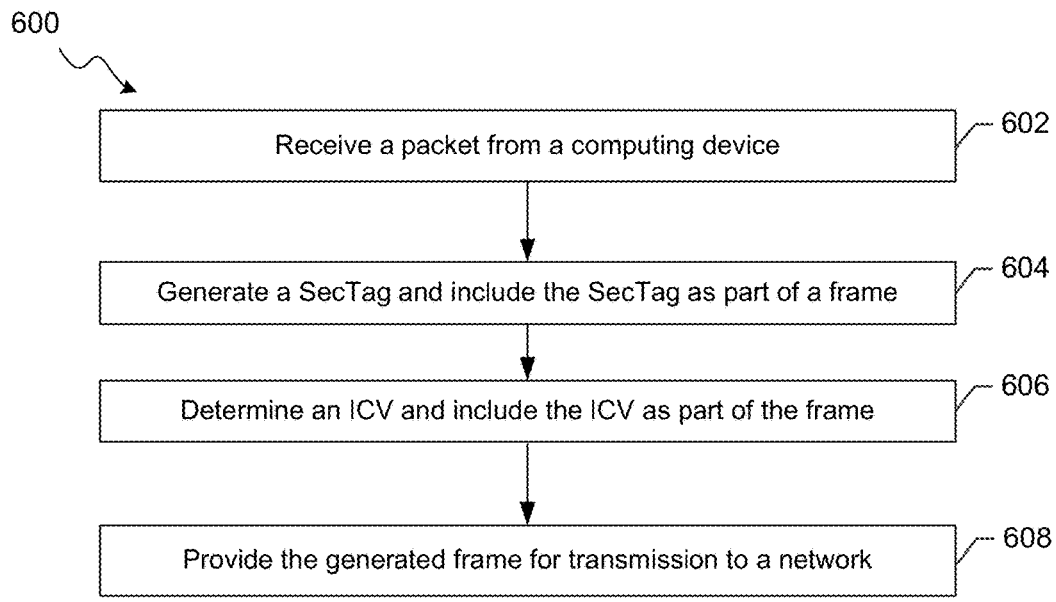

The network device 104 provides the generated frame for transmission to the network 140 (510). The Ethernet frame format 300 of FIG. 3 provides one example of the generated frame, which includes the VLAN tag, SecTag, and ICV. In some aspects such as shown in FIG. 6, no VLAN tag is included in the frame. In these cases, the frame may be referred to as a VLAN untagged frame.

FIG. 6 illustrates a flow diagram of an example process 600 for generating a VLAN untagged frame and providing the VLAN untagged frame for transmission in accordance with one or more implementations. For explanatory purposes, the example process 600 is primarily described herein with reference to the network device 104 of the network environments 100 and 200 of FIGS. 1 and 2, and the Ethernet frame format 400 of FIG. 4. For example, the network device 104 may generate a VLAN untagged frame and provide the generated VLAN untagged frame for transmission to the network 140. However, the example process 600 is not limited to the network device 104, and one or more blocks of the example process 600 may be performed by one or more components of the network device 104.

The blocks of the process 600 do not need to be performed in the order shown. It is understood that the depicted order is an illustration of one or more example approaches, and are not meant to be limited to the specific order or hierarchy presented. The blocks can be rearranged, and/or two or more of the blocks can be performed simultaneously. Additional blocks, fewer blocks, and/or different blocks may be provided. Furthermore, some of the blocks of example process 600 may be performed in a manner similar to corresponding blocks of example process 500 of FIG. 5.

The network device 104 receives a packet from the computing device 124 (602). The network device 104 generates a frame based on the packet received from the computing device 124. The generation of the frame includes blocks 604 and 606. The network device 104 generates a SecTag and includes the SecTag as part of the frame (604). The network device 104 determines the ICV and includes the ICV as part of the frame (606). The ICV is computed using a default VLAN ID and a default priority (e.g., .1p priority) of the EVC at the UNI, although no VLAN tag is inserted in the frame. The network device 104 provides the generated frame for transmission to the network 140 (608). The Ethernet frame format 400 of FIG. 4 provides one example of the generated frame, which includes the SecTag and ICV.

Figure 7:
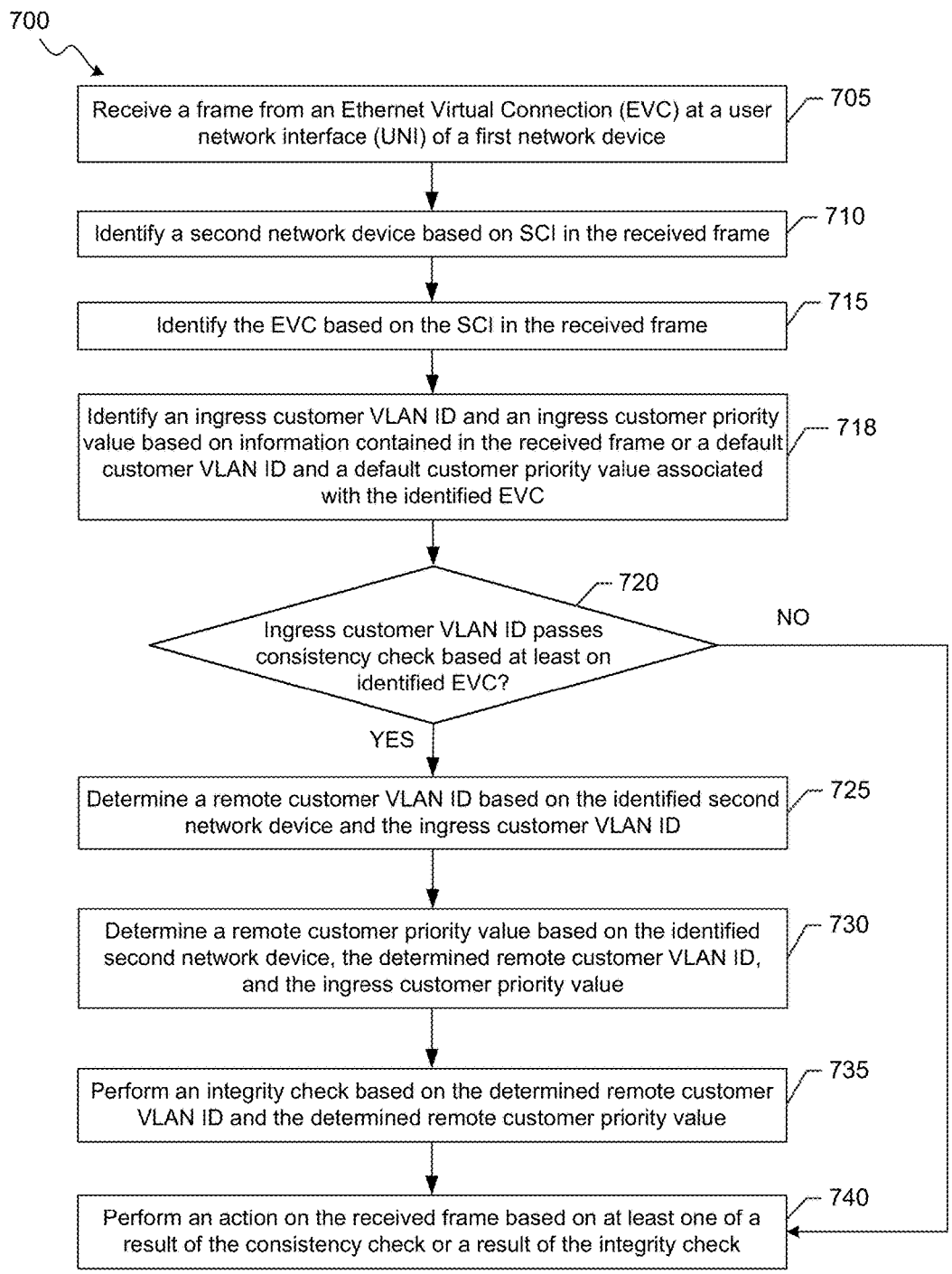
FIG. 7 illustrates a flow diagram of an example process for processing a frame in accordance with one or more implementations.

FIG. 7 illustrates a flow diagram of an example process 700 for processing a frame in accordance with one or more implementations. The blocks of the process 700 do not need to be performed in the order shown. It is understood that the depicted order is an illustration of one or more example approaches, and are not meant to be limited to the specific order or hierarchy presented. The blocks can be rearranged, and/or two or more of the blocks can be performed simultaneously. Additional blocks, fewer blocks, and/or different blocks may be provided. For explanatory purposes, the example process 700 is primarily described herein with reference to the network devices 102 and 104 of the network environments 100 and 200 of FIGS. 1 and 2. However, the example process 700 is not limited to the network devices 102 and 104, and one or more blocks of the example process 700 may be performed by one or more components of the network devices 102 and 104.

The network device 102 (e.g., a customer edge device) receives a frame at an ingress port from the network device 110A (e.g., a provider edge device) (705). The received frame may encapsulate data (e.g., a payload) that is encrypted. In one or more implementations, the frame may have the Ethernet frame format 300 of FIG. 3. The frame may have one of the Ethernet frame formats 400, 1400, 1500, or 1600 shown in FIGS. 4, 14, 15, and 16, respectively.

If the received frame is not tagged or otherwise has no VLAN ID and/or no priority value, a default VLAN ID and/or a default priority value are used as the ingress VLAN ID and the ingress priority value, respectively. In such cases, the default VLAN ID and default priority value of the EVC at the ingress UNI will be utilized and the frame is received at the ingress port associated with the default VLAN ID and default priority value.

The network device 102 identifies the network device 104 associated with the received frame based on information contained in the received frame (710). In one or more implementations, the second network device 104, which may be referred to as a remote site of the network device 102, is identified based on the SCI field in the SecTag (e.g., the SecTag field 308 in FIG. 3) of the received frame. Based on the SCI field, the first network device 102 can determine from which secure channel the packet is received, which in turn may be used to identify the second network device 104.

In one or more implementations, the network device 104 is a network device (e.g., customer edge device) that encrypts a packet and provides the encrypted packet as part of a frame (e.g., encrypted packet encapsulated in the frame) for transmission to the network device 102 via the network 140. In alternative implementations, the network device 104 might not have encrypted the packet. Rather, the network device 104 may have received a frame with an encrypted packet (e.g., from a customer device) that is to be provided for transmission by the network device 104 to the network device 102 via the network 140. The network 140 may provide an EVC that facilitates such transmissions.

After identifying the network device 104, the network device 102 identifies an EVC through which the frame was transmitted based on information contained in the received frame (715). In one or more implementations, the EVC is identified based on the SCI contained in the SecTag of the received frame. With reference to FIG. 1, in one or more implementations, each of the network devices 102, 104, 106, and 108 may subscribe to one or more EVCs. Each EVC may have a corresponding set of supported VLAN IDs to be used with the EVC.

The network device 102 identifies the ingress VLAN ID and the ingress priority value (718). In one or more implementations, when the received frame is tagged, the network device 102 identifies the ingress VLAN ID and the ingress priority value from the VLAN tag. In one or more implementations, when the received frame is not tagged or otherwise has no VLAN ID and/or priority value, the network device 102 identifies the default customer VLAN ID and/or the default priority value associated with the ingress EVC at the UNI as the ingress VLAN ID and the ingress priority value, respectively.

The network device 102 determines whether the ingress VLAN ID of the received packet passes a consistency check with respect to the identified EVC (720). If the received frame does not pass the consistency check (720), an action is performed on the received frame based on the result of the consistency check (740). In one or more implementations, the action includes dropping the received frame if the received frame does not pass the consistency check. If the received frame passes the consistency check (720), the network device 102 determines a remote VLAN ID associated with the identified network device 104 based on the identified network device 104 and the ingress VLAN ID (725).

In one or more implementations, the network device 102 determines the remote VLAN ID associated with the network device 104 (725) by performing a lookup on a data structure, such as a VLAN ID mapping table, using an index/identifier associated with the identified network device 104 (e.g., remote site ID) and the ingress VLAN ID as keys. If a mapping is not found when using the remote site ID and the ingress VLAN ID as keys, the remote VLAN ID associated with the network device 104 is set equal to the ingress VLAN ID.

The network device 102 determines a remote priority value based on the identified second network device 104, the determined remote VLAN ID, and the ingress priority value (730). In one or more implementations, the remote priority value is determined by performing a table lookup on a data structure, such as a priority value mapping table, using the remote site ID, remote VLAN ID, and ingress priority value as keys. If the received frame is untagged, the default priority value of the EVC at the UNI can be utilized as the ingress priority value. If the mapping is not found in the table, the remote priority value is set equal to the ingress priority value.

The network device 102 then performs an integrity check based on the determined remote VLAN ID and the determined remote priority value (735). In one or more implementations, the integrity check is performed by computing an ICV based on the IEEE 802.1AE standard using the determined remote VLAN ID and the determined remote priority value, and comparing the computed ICV with the ICV that is contained in the received frame (hereafter referred to as the received ICV).

The network device 102 performs an action on the received frame based at least on the result of the integrity check (740). In one or more implementations, when the computed ICV and the received ICV match, the frame received by the network device 102 is authenticated successfully (e.g., the integrity check is successful). In this instance, the action performed by the first network device 102 may include transmitting the frame or portion thereof (e.g., payload) to an intended endpoint recipient. In one or more implementations, when the computed ICV and the received ICV are different, the received frame fails authentication (e.g., the integrity check fails). In this instance, the action performed by the first network device 102 may include dropping the frame.

FIGS. 8 through 12 illustrate examples of frames, such as Ethernet frames, that may be transmitted by the network device 104 and received by the network device 102 in accordance with one or more implementations.

FIG. 8 illustrates an example in which a frame is transmitted from the network device 104 to the network device 102 through a first EVC in accordance with one or more implementations. As shown in FIG. 8, the VLAN ID contained in the frame 820 transmitted from an egress port of the network device 104 is preserved (e.g. not translated) in the frame 822 received at an ingress port of the network device 102. For example, both the frames 820 and 822 contain a VLAN ID of "100".

FIG. 9 illustrates an example in which a frame is transmitted from the network device 104 to the network device 102 through a second EVC in accordance with one or more implementations. As shown in FIG. 9, the VLAN ID ("100") contained in the frame 920 transmitted from an egress port of the network device 104 is different from the VLAN ID ("200") in the frame 922 received at an ingress port of the network device 102. Thus, the VLAN ID has been translated by one or more network devices along the second EVC. In one or more implementations, one of the provider edge devices (e.g., network device 110A) between the network device 102 and the network device 104 has translated the VLAN ID of the frame 920.

FIG. 10 illustrates an example in which a frame is transmitted from the network device 104 to the network device 102 through a third EVC in accordance with one or more implementations. As shown in FIG. 10, a VLAN ID ("100") is contained in the frame 1020 transmitted from an egress port of the network device 104, whereas the frame 1022 received at an ingress port of the network device is untagged. The VLAN tag has been removed by one of the network devices along the third EVC. In one or more implementations, one of the provider edge devices (e.g., network device 110A) between the network device 102 and the network device 104 has removed the VLAN ID of the frame 1020.

Figure 11:
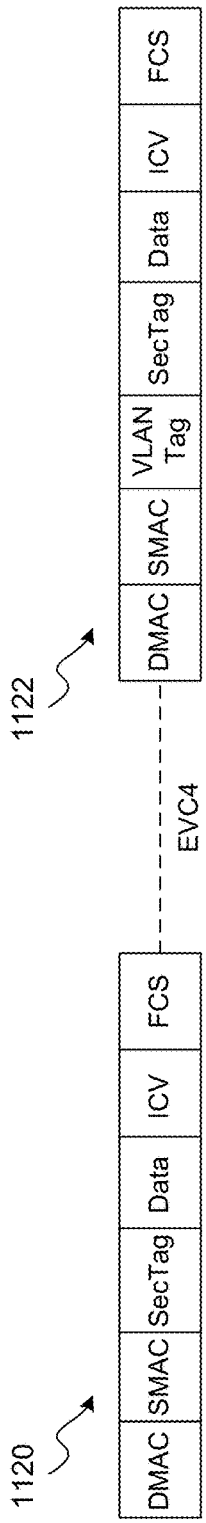

FIG. 11 illustrates an example in which a frame is transmitted from the network device 104 to the network device 102 through a fourth EVC in accordance with one or more implementations. The frame 1120 transmitted from an egress port of the network device 104 is untagged, whereas the frame 1122 received at an ingress port of the network device 102 contains a VLAN tag ("100"). The VLAN tag has been added to the frame 1120 by one or more network devices along the fourth EVC. In one or more implementations, one of the provider edge devices (e.g., network device 110A) between the network device 102 and the network device 104 has added the VLAN ID to the frame 1120.

Figure 12:
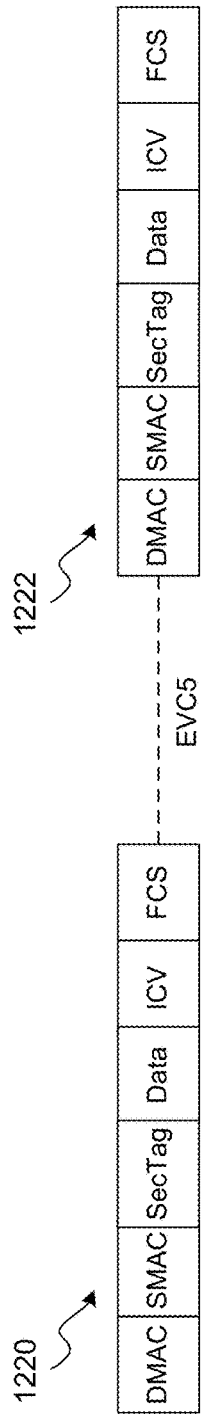

FIG. 12 illustrates an example in which a frame is transmitted from the network device 104 to the network device 102 through a fifth EVC in accordance with one or more implementations. The frame 1220 transmitted from an egress port of the network device 104 is untagged and the frame 1222 received at an ingress port of the network device 102 is also untagged.

In one or more implementations, the translation of VLAN IDs, removal of VLAN tags, and/or adding of VLAN tags in a frame facilitates network deployment in multiple locations. Although not shown in FIGS. 8 through 12, alternatively or in conjunction with translating VLAN IDs, the priority values (e.g., .1 priority values) may be translated in VLAN tags.

Figure 13:
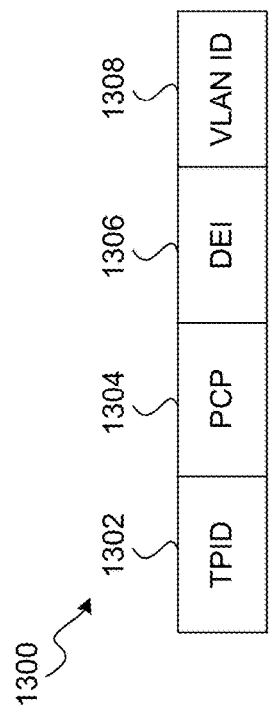
FIG. 13 illustrates a VLAN tag field in accordance with one or more implementations.

FIG. 13 illustrates an example of VLAN tag field 1300 in accordance with one or more implementations. The VLAN tag field 1300 may be inserted into a frame, such as an Ethernet frame. In one or more implementations, the VLAN tag field 1300 is utilized as the VLAN tag field 306 of FIG. 3. The VLAN tag field 1300 includes a tag protocol identifier (TPID) field 1302, a PCP field 1304, a drop eligible indicator (DEI) field 1306, and a VLAN identifier (VLAN ID) field 1308. The TPID field 1302 includes a numerical identifier 0x8100 to identify the frame as a VLAN-tagged frame. The PCP field 1304 includes a value (e.g., numerical value) of a QoS priority (e.g., .1p priority) for the frame. In one or more implementations, in the presence of congestion, traffic associated with higher priority is maintained whereas traffic associated with lower priority is dropped. The DEI field 1306 includes information that can be used separately or in conjunction with the PCP field 1304 to indicate frames that are eligible to be dropped in the presence of congestion. The VLAN ID field 1308 includes information for specifying the VLAN ID to which a given frame belongs. In one or more implementations, the PCP field 1304 is a 3-bit field, theoretically allowing for integer values from 0 to $2^3-1$, inclusive. In one or more implementations, the VLAN ID field 1308 is a 12-bit field, theoretically allowing for integer values from 0 to $2^{12}-1$, inclusive.

In one or more implementations, a SecTag field (e.g., 308 in FIG. 3A) of a given frame is inserted after the VLAN tag field in the frame, as shown in the Ethernet frame format 300 of FIG. 3. In such implementations, the VLAN tags are not encrypted. In order to secure the VLAN tags, devices, such as network devices 102, 104, 106, 108 of FIG. 1 (and/or other coupled devices), includes the VLAN tags in a computation of ICVs for transmitted packets. Including the VLAN tag in the ICV computation allows the VLAN tag to be protected when transmitted over a network (e.g., network 140).

In one or more implementations, if an egress frame to be sent to an EVC at an UNI is VLAN tagged, the VLAN tag will be used in the ICV computation. If the egress frame is VLAN untagged (e.g., does not have a VLAN tag), such as shown in the Ethernet frame format 400 of FIG. 4, the default VLAN ID and the default QoS priority (e.g., .1p priority) of the EVC at the UNI are used in the computation of the ICV. In one or more implementations, each EVC at an UNI has a default VLAN ID and a default QoS priority (e.g., default .1p priority) that can be utilized for transmitting and/or receiving untagged frames.

In one or more implementations, traffic (e.g., frames) transmitted from one provider edge device (e.g., network device 110A) to any other provider edge device (e.g., network device 110B) is directed through use of multiprotocol label switching (MPLS). A frame may include an MPLS path label that can be utilized to identify a path of a frame from one provider edge device (e.g., network device 110A) to any other provider edge device (e.g., network device 110B). For example, a path label may contain information used to determine that traffic from network device 110A to network device 110B passes through network device 110E.

In one or more implementations, traffic (e.g., frames) received by a provider edge device (e.g., network device 110B) from the provider network is transmitted to at least one of one or more customer edge devices (e.g., network devices 106, 108) in communication with the provider edge device. A frame may include a pseudowire (PW) label that can be utilized to identify a path from the provider edge device to at least one of the one or more customer edge devices. For example, a PW label may indicate that the network device 110B transmits the received traffic to the network device 106. As another example, another PW label may indicate that the network device 110B transmits the received traffic to the network device 108.

Figure 14:
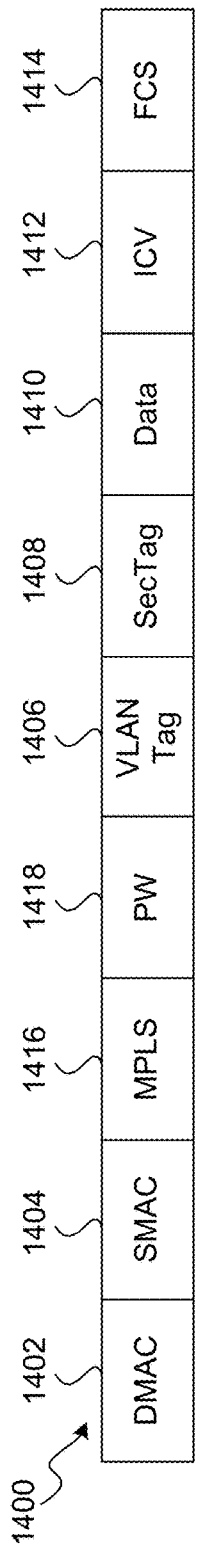
FIGS. 14 through 16 illustrate additional example Ethernet frame formats that utilize media access control security in accordance with one or more implementations.

FIG. 14 illustrates another example of an Ethernet frame format 1400 in a provider network that utilizes MACSec in accordance with one or more implementations. The Ethernet frame format 1400 includes a DMAC field 1402, an SMAC field 1404, an MPLS field 1416, a PW field 1418, a VLAN tag field 1406, a SecTag field 1408, a data field 1410, an ICV field 1412, and a frame check sequence (FCS) field 1414. The MPLS field 1416 may include information that can be utilized to determine a next hop of a frame along a path that connects a provider edge device to another provider edge device. The PW field 1418 may include information that can be utilized to determine an intended recipient device of the frame. The intended recipient of the frame may be a customer edge device (e.g., network device 106 or 108). In one or more implementations, the fields 1402, 1404, 1406, 1408, 1410, 1412, and 1414 includes the same or similar information as the corresponding fields shown in the Ethernet frame formats 300 and 400 in FIGS. 3 and 4, respectively.

Figure 15:
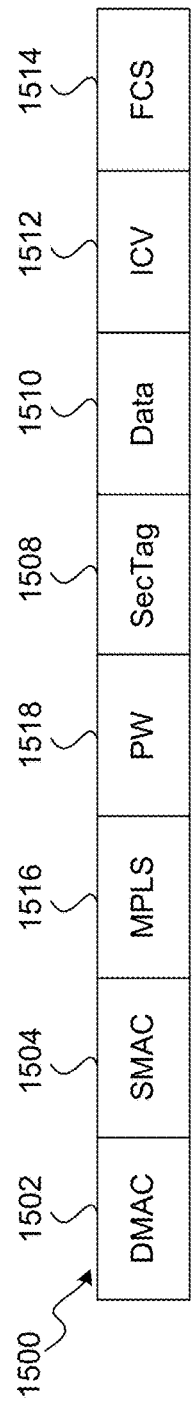

FIG. 15 illustrates another example of an Ethernet frame format 1500 in a provider network that utilizes MACSec in accordance with one or more implementations. The Ethernet frame format 1500 includes a DMAC field 1502, an SMAC field 1504, an MPLS field 1516, a PW field 1518, a SecTag field 1508, a data field 1510, an ICV field 1512, and an FCS field 1514. In one or more implementations, the fields 1502, 1504, 1508, 1510, 1512, and 1514 includes the same or similar information as the corresponding fields shown in the Ethernet frame formats 300, 400, and 1400 in FIGS. 3, 4, and 14, respectively. In one or more implementations, the MPLS field 1516 and PW field 1518 can include the same or similar information as the MPLS field 1416 and PW field 1418, respectively, shown in the Ethernet frame format 1400 in FIG. 14. The Ethernet frame format 1500 can be referred to as a VLAN untagged frame, since the Ethernet frame format 1500 does not include a VLAN tag field.

Figure 16:
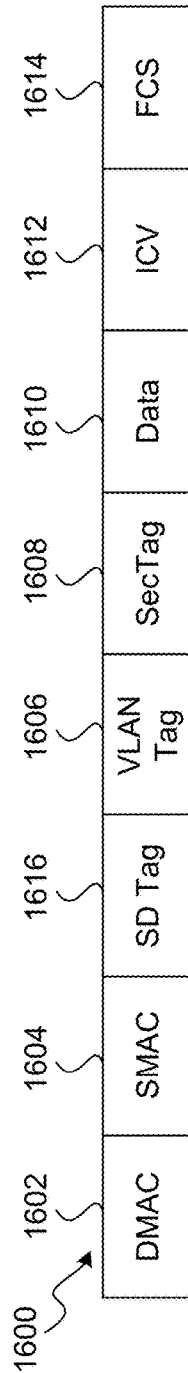

In one or more implementations, the network devices 102, 104, 106, and/or 108 transmits IEEE 802.1ad frames (e.g., Q-in-Q frames) that include a service delimiter tag (SD tag). In Q-in-Q, two VLAN tags may be utilized, where a first VLAN tag may be referred to as an SD tag and a second VLAN tag may be referred to as a customer VLAN tag. In one or more implementations, the SD tag is placed in front of the customer VLAN tag. FIG. 16 illustrates an example Ethernet frame format 1600 that utilizes MACSec and Q-in-Q, in accordance with one or more implementations. The Ethernet frame format 1600 includes a DMAC field 1602, SMAC field 1604, SD tag field 1616, VLAN tag field 1606, SecTag field 1608, data field 1610, ICV field 1612, and FCS field 1614. The SD tag field 1616 may include an Ethertype field assigned to numerical identifier 0x88A8. In one or more implementations, the fields 1602, 1604, 1606, 1608, 1610, 1612, and 1614 includes the same or similar information as information included in the corresponding fields (e.g., fields 302, 304, 306, 308, 310, 312, and 314, respectively, of FIG. 3) shown in Ethernet frame formats 300, 400, 1400, and 1500 in FIGS. 3, 4, 14, and 15, respectively. The SecTag field 1608 is inserted after the customer VLAN tag field 1606 such that a service provider may perform VLAN translation and enforce QoS priority (e.g., .1p priority).

In one or more implementations, a Carrier Ethernet service provided over a network (e.g., network 140) multiplexes both intranet and extranet services across the same UNI. For intranet traffic, the service can be an E-LAN service or multiple E-line services. For extranet traffic, multiple E-Line services to distinct xSP's, such as an Internet Service Provider's point of presence, storage service provider, and so forth, may be used. An SD tag 1616 may be used at the UNI to identify which E-Line/E-LAN is used for forwarding. Since the SD tag 1616 has local significance only, the SD tag 1616 is not included in the ICV computation for authentication. If an attacker changes the SD tag 1616 of packets at the UNI on entrance to the provider's network, the packets might be forwarded to the wrong peer and would then be dropped if MACSec is deployed. However, the customer VLAN tag field 1606 may be subject to attack and should be protected by including the customer VLAN tag in the ICV computation for authentication. An additional consistency check is performed against the SD tag 1616 on ingress based on the SCI in the SecTag field 1608. The consistency check may be utilized to prevent attacks on the SD tag 1616 of ingress packets at the UNI after exiting the provider's network that may cause incorrect Layer 2 learning at ingress devices.

In one or more implementations, the subject technology allows for a MACSec SecTag to be inserted after a customer VLAN tag to make the customer VLAN tag visible (e.g., in clear text) at the UNI. The SecTag may be inserted after the customer VLAN when, by way of non-limiting example, one or more of the following apply: customer traffic at the UNI is multiplexed into multiple EVCs based on the customer VLAN tag; QoS is enforced in a provider network based on the QoS priority in the customer VLAN tag; customer VLAN tag is used for Layer 2 forwarding in the provider network (e.g., E-LAN); and/or VLAN translation is required.

Figure 17:
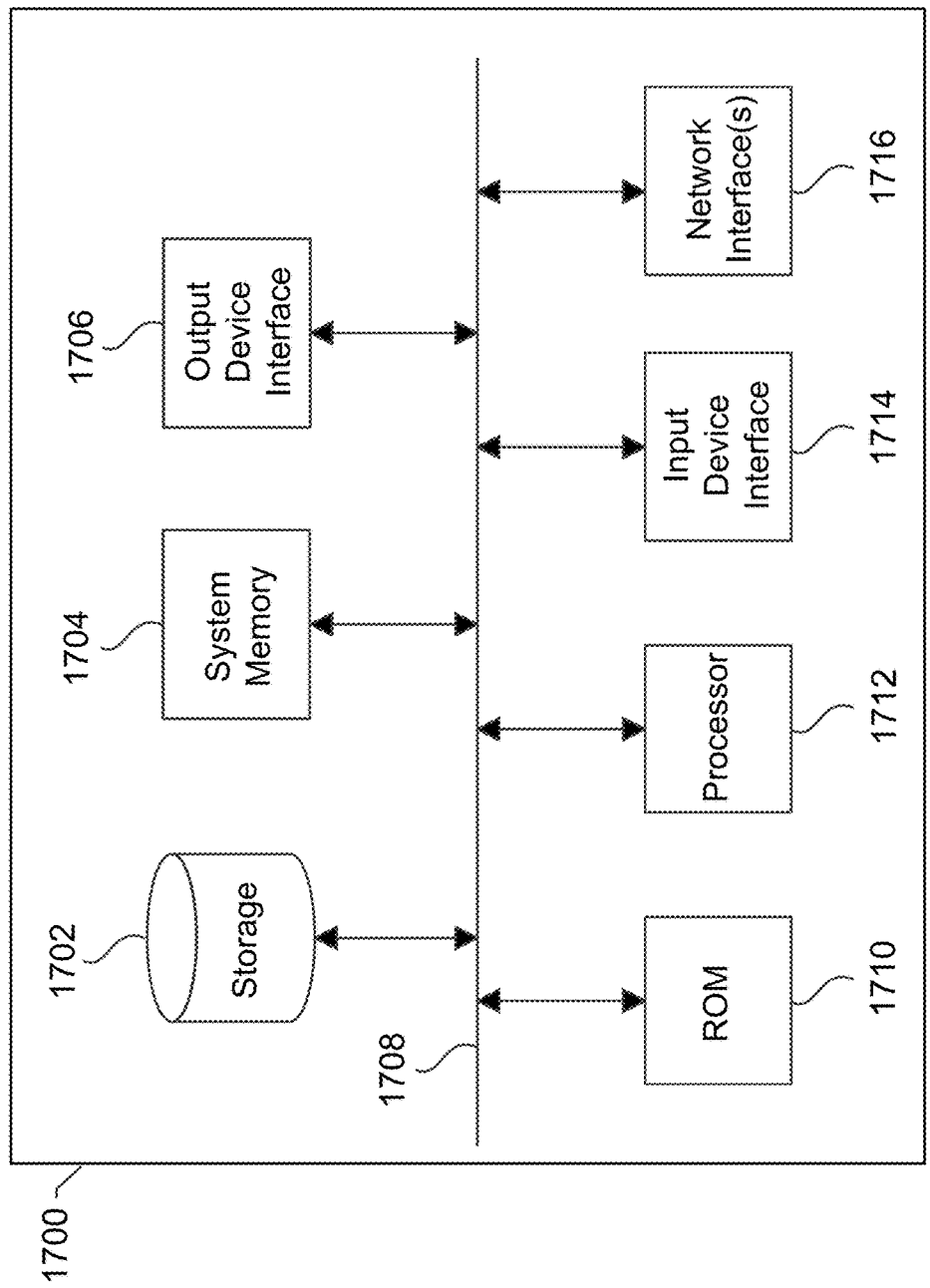
FIG. 17 conceptually illustrates an electronic system with which aspects of the subject technology may be implemented.

FIG. 17 conceptually illustrates an electronic system 1700 with which one or more implementations of the subject technology may be implemented. The electronic system 1700, for example, can be a server, a switch, a router, a base station, a receiver, or generally any electronic device that transmits signals over a network. The electronic system 1700 can be, and/or can be a part of, one or more of the network devices 102, 104, 106, 108, 110A-G, 122, 124, 126, 128, 130, 132, and 134 shown in FIG. 1. Such an electronic system includes various types of computer readable media and interfaces for various other types of computer readable media. The electronic system 1700 includes a bus 1708, one or more processing unit(s) 1712, a system memory 1704 (and/or buffer), a read-only memory (ROM) 1710, a permanent storage device 1702, an input device interface 1714, an output device interface 1706, and one or more network interfaces 1716, or subsets and variations thereof.

The bus 1708 collectively represents all system, peripheral, and chipset buses that communicatively connect the numerous internal devices of the electronic system 1700. In one or more implementations, the bus 1708 communicatively connects the one or more processing unit(s) 1712 with the ROM 1710, the system memory 1704, and the permanent storage device 1702. From these various memory units, the one or more processing unit(s) 1712 retrieves instructions to execute and data to process in order to execute the processes of the subject disclosure. The one or more processing unit(s) 1712 can be a single processor or a multi-core processor in different implementations.

The ROM 1710 stores static data and instructions that are needed by the one or more processing unit(s) 1712 and other modules of the electronic system 1700. The permanent storage device 1702, on the other hand, may be a read-and-write memory device. The permanent storage device 1702 may be a non-volatile memory unit that stores instructions and data even when the electronic system 1700 is off. In one or more implementations, a mass-storage device (such as a magnetic or optical disk and its corresponding disk drive) may be used as the permanent storage device 1702.

In one or more implementations, a removable storage device (such as a floppy disk, flash drive, and its corresponding disk drive) may be used as the permanent storage device 1702. Like the permanent storage device 1702, the system memory 1704 may be a read-and-write memory device. However, unlike the permanent storage device 1702, the system memory 1704 may be a volatile read-and-write memory, such as random access memory. The system memory 1704 may store any of the instructions and data that one or more processing unit(s) 1712 may need at runtime. In one or more implementations, the processes of the subject disclosure are stored in the system memory 1704, the permanent storage device 1702, and/or the ROM 1710. From these various memory units, the one or more processing unit(s) 1712 retrieves instructions to execute and data to process in order to execute the processes of one or more implementations.

The bus 1708 also connects to the input and output device interfaces 1714 and 1706. The input device interface 1714 enables a user to communicate information and select commands to the electronic system 1700. Input devices that may be used with the input device interface 1714 may include, for example, alphanumeric keyboards and pointing devices (also called "cursor control devices"). The output device interface 1706 may enable, for example, the display of images generated by electronic system 1700. Output devices that may be used with the output device interface 1706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 17, the bus 1708 also couples the electronic system 1700 to one or more networks, such as network 140, and/or to one or more network nodes, such as the network devices 102, 104, 106, 108, 110A-G, 122, 124, 126, 128, 130, 132, and 134 shown in FIG. 1, through the one or more network interface(s) 1716. In this manner, the electronic system 1700 can be a part of a network of computers (such as a LAN, a wide area network ("WAN"), or an Intranet, or a network of networks, such as the Internet. Any or all components of the electronic system 1700 can be used in conjunction with the subject disclosure.

Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
a memory; and at least one processor circuit configured to:
receive a frame from an ingress Ethernet Virtual Connection (EVC) at an user network interface (UNI),
wherein the received frame includes a first virtual local area network identifier (VLAN ID) and a first integrity check value;
identify a network device from which the received frame originated based at least on a channel identifier contained in the received frame;
determine a second VLAN ID associated with the identified network device based at least on the identified network device and the first VLAN ID, the second VLAN ID being different from the first VLAN ID; and
generate a second integrity check value based on at least a portion of the received frame and the second VLAN ID, and
perform an integrity check for the received frame by comparing the first integrity check value to the second integrity check value, wherein, the second VLAN ID is not included in the received frame when the integrity check is performed.

2. The device of claim 1,
wherein the received frame is further associated with a first priority value and
the at least one processor circuit is further configured to:
determine a second priority value associated with the identified network device based on the identified network device, the determined second VLAN ID, and the first priority value,
wherein the second integrity check value is generated is based on the at least the portion of the received frame, the determined second VLAN ID, and the determined second priority value.

3. The device of claim 2, wherein:
the received frame comprises a VLAN tag and a security tag inserted after the VLAN tag, and the second VLAN ID is different from the first VLAN ID.

4. The device of claim 1,
wherein the channel identifier comprises a secure channel identifier (SCI) and
the at least one processor circuit is further configured to:
identify the ingress EVC based on the SCI; and
perform a consistency check on the first VLAN ID based on the identified ingress EVC and one or more VLAN IDs associated with the identified ingress EVC.

5. The device of claim 1,
wherein the at least one processor circuit is further configured to:
perform an action on the received frame based at least on a result of the integrity check.

6. The device of claim 5, wherein:
the received frame comprises a packet, and
the action comprises providing for transmission the packet to a second network device when the integrity check is successful,
wherein the second network device is associated with a destination address contained in the received frame.

7. A method, comprising:
receiving a frame from an Ethernet Virtual Connection (EVC) at a universal network interface (UNI) of a first network device,
wherein the received frame is associated with
a first virtual local area network identifier (VLAN ID) and
a first priority value, and
the received frame includes a first integrity check value;
identifying a second network device based at least on a secure channel identifier (SCI) contained in the received frame;
determining a second VLAN ID associated with the identified second network device based at least on the identified second network device and the first VLAN ID;
determining a second priority value associated with the identified second network device based at least on the identified second network device, the determined second VLAN ID, and the first priority value;
computing a second integrity check value from at least a portion of the received frame, the second VLAN ID, and the second priority value; and
performing an integrity check based at least on a comparison between the first integrity check value and the second integrity check value, the second VLAN ID not being included in the received frame.

8. The method of claim 7, further comprising:
identifying the ingress EVC based at least on the SCI; and
performing a consistency check on the first VLAN ID based on the identified ingress EVC and one or more VLAN IDs associated with the identified ingress EVC.

9. The method of claim 7, further comprising
performing an action on the received frame based at least on a result of the integrity check.

10. The method of claim 7, wherein:
the received frame comprises a VLAN tag and a security tag inserted after the VLAN tag, and the second priority value is different from the first priority value.

11. A computer program product comprising instructions stored in a non-transitory computer-readable storage medium, the instructions being executable by a processor to perform operations and the instructions comprising:
instructions to receive a frame at a first network device, wherein the frame is associated with a first virtual local area network identifier (VLAN ID);

instructions to identify a second network device based at least on the frame, the second network device having inserted a first integrity check value into the frame;

instructions to determine a second VLAN ID associated with the identified second network device based at least on the identified second network device and the first VLAN ID;

instructions to generate, by the first network device, a second integrity check value based on at least a portion of the frame and the second VLAN ID; and instructions to perform an integrity check for the frame to confirm that the first integrity check value inserted into the frame by the second network device is the same as the second integrity check value generated by the first network device, wherein the second VLAN ID is not included in the frame when the integrity check is performed.

12. The computer program product of claim 11, wherein the second network device is identified based on a secure channel identifier (SCI) contained in the received frame.

13. The computer program product of claim 12, wherein the instructions to receive the frame comprise instructions to receive the frame from an ingress Ethernet Virtual Connection (EVC) at a user network interface (UNI) of the first network device.

14. The computer program product of claim 13, wherein the instructions further comprise:
instructions to identify the ingress EVC based at least on the SCI; and
instructions to perform a consistency check on the first VLAN ID based on the identified ingress EVC and one or more VLAN IDs associated with the identified ingress EVC.

15. The computer program product of claim 13, wherein the instructions further comprise:
instructions to identify the first VLAN ID based on information contained in the frame or a default VLAN ID associated with the ingress EVC from which the frame is received.

16. The computer program product of claim 13, wherein the instructions further comprise:
instructions to set the first VLAN ID to a default VLAN ID associated with the ingress EVC from which the frame is received when the received frame is devoid of a VLAN tag.

17. The computer program product of claim 13, wherein the frame is further associated with a first priority value, the instructions further comprising:
instructions to identify the first priority value based on information contained in the frame or a default priority value associated with the ingress EVC from which the frame is received; and
instructions to determine a second priority value associated with the identified second network device based on the identified second network device, the determined second VLAN ID, and the identified first priority value, wherein the integrity check is based at least on the determined second VLAN ID and the determined second priority value.

18. The computer program product of claim 17, wherein the instructions to perform the integrity check comprise:
instructions to generate the second integrity check value based at least on the determined second VLAN ID and the determined second priority value; and
instructions to compare the second integrity check value with the first integrity check value contained in the received frame, wherein the integrity check passes when the first integrity check value matches the second integrity check value and the integrity check fails when the first integrity check value does not match the second integrity check value.

19. The computer program product of claim 11, wherein the instructions further comprise: instructions to perform an action on the received frame based at least on a result of the integrity check.

20. The computer program product of claim 19, wherein:
the received frame comprises a packet, and
the action comprises providing the packet and the first VLAN ID to a third network device, wherein the third network device is associated with a destination address contained in the received frame.

21. The computer program product of claim 11, wherein:
the received frame comprises encrypted data,
the instructions further comprise instructions to decrypt the encrypted data, and
the first network device is a first customer edge device and the second network device is a second customer edge device.

22. The computer program product of claim 11, wherein the received frame comprises a VLAN tag and a security tag inserted after the VLAN tag.

* * * * *